US007949562B2

(12) United States Patent
Collins

(10) Patent No.: US 7,949,562 B2
(45) Date of Patent: May 24, 2011

(54) SYSTEM AND METHOD FOR OPTIMIZING ADVERTISEMENT CAMPAIGNS USING A LIMITED BUDGET

(75) Inventor: Robert J. Collins, Carlsbad, CA (US)

(73) Assignee: Yahoo! Inc., Sunnyvale, CA (US)

( * ) Notice: Subject to any disclaimer, the term of this patent is extended or adjusted under 35 U.S.C. 154(b) by 848 days.

(21) Appl. No.: 11/321,729

(22) Filed: Dec. 28, 2005

(65) Prior Publication Data

US 2007/0028263 A1 Feb. 1, 2007

Related U.S. Application Data

(60) Provisional application No. 60/703,904, filed on Jul. 29, 2005.

(51) Int. Cl.
*G06Q 30/00* (2006.01)

(52) U.S. Cl. .................................. 705/14.43; 705/14.42

(58) Field of Classification Search .................... 705/14, 705/14.43, 14.42
See application file for complete search history.

(56) References Cited

U.S. PATENT DOCUMENTS 6,269,361 B1 * 7/2001 Davis et al. ....................... 707/3
6,757,661 B1 * 6/2004 Blaser et al. .................... 705/14
7,363,302 B2 * 4/2008 Lester ............................... 707/7
2002/0077880 A1 * 6/2002 Gordon et al. .................. 705/10
2002/0077998 A1 * 6/2002 Andrews et al. .................. 707/1
2003/0033192 A1 * 2/2003 Zyman et al. ................... 705/10
2003/0115099 A1 * 6/2003 Burns et al. ..................... 705/14
2003/0229536 A1 * 12/2003 House et al. .................... 705/10
2006/0173744 A1 * 8/2006 Kandasamy et al. ........... 705/14

OTHER PUBLICATIONS

Anonymous, Special Report-Online: Search and ye shall find, Jan. 20, 2005, Marketing Week, pp. 43.*

* cited by examiner

*Primary Examiner* — John G Weiss
*Assistant Examiner* — Michael Stibley
(74) *Attorney, Agent, or Firm* — Seth H. Ostrow; Ostrow Kaufman

(57) ABSTRACT

The present invention relates to systems and methods for the optimized selection and delivery of one or more advertisements from among one or more advertising campaigns. The method of the present invention comprises generating one or more media plans identifying execution parameters for the optimized selection and delivery of one or more advertisements. One or more advertisements organized according to one or more advertisement campaigns are retrieved. Additionally, advertiser specified constraint and target values associated with the one or more advertisements are retrieved. A forecast for the performance of the one or more advertisements is generated. A media plan is generated for the one or more advertisements according to the constraint and target values, as well as the forecast data. The one or more advertisements are distributed according to the execution parameters identified by the media plan.

40 Claims, 4 Drawing Sheets

SYSTEM AND METHOD FOR OPTIMIZING ADVERTISEMENT CAMPAIGNS USING A LIMITED BUDGET

RELATED APPLICATIONS

This application claims priority to U.S. Provisional Patent Application Ser. No. 60/703,904, entitled "SYSTEM AND METHOD ALLOWING INFORMATION PROVIDER ACCESS TO A NETWOKED DATABASE SEARCH SYSTEM," filed on Jul. 29, 2005, the disclosure of which is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates in general to advertising, and in particular to advertising campaign management and optimization systems and methods. More specifically, the present invention provides methods and systems for facilitating the selection and delivery of advertisements using advertiser imposed constraints and targets to generate one or more media plans for distributing one or more advertisements.

An advertisement campaign may include a set of one or more advertising activities or conduct directed to accomplishing an advertising goal, such as the marketing or sales of a particular product, service, or content, or a group of products, services or content. The success of an advertising campaign depends on making the most efficient possible use of an advertising budget so as to maximally influence audience behavior. For example, if a campaign is directed to selling a product, then the advertiser may seek to use a given budget to purchase advertising so as to cause a maximum amount of consumers to purchase the product. Determining how to efficiently and optimally spend an advertising budget, as well as implementing and managing an ongoing advertising campaign utilizing such a budget, can pose a daunting challenge to advertisers.

Increasingly, advertising campaigns include online or Internet-based advertising. With ever-increasing Internet use, it is only natural that greater advertising resources are directed to this growing audience. Furthermore, Internet-based advertising allows great opportunities for advertisers to deliver much more targeted, relevant ads than conventional, off-line advertising techniques, such as billboards and the like.

An increasingly important area of advertising includes sponsored listings. Such listing can be presented, for example, in the form of sponsored links appearing among the results of a search conducted using an Internet-based search engine, such as Yahoo!, Ask Jeeves, etc. For instance, auction-based systems exist in which advertisers bid to be included among the sponsored search results for a particular search term or terms, and for the ranking or position of the placement of their sponsored listing among such results.

Online advertisers participating in such an auction-based system may face the challenge of managing and optimizing the ongoing bid process, for example, managing and optimizing thousands or hundreds of thousands of search terms or groups of search terms. Moreover, an advertiser may need to manage and optimize numerous advertising campaigns across numerous disparate advertising channels. A "channel" includes, but is not limited to, a particular entity, organization, or the like, through which advertising may be conducted. In the on-line advertising context, for example, channels can include web sites or search engines such as Yahoo!, MSN, CNN, etc.

While methods exist for the automatic bidding and maintenance of advertisement campaigns, current techniques do not provide advertisers with the ability to specify a maximum budget and have such a budget optimally spent on one or more advertisements in one or more campaigns. Advertisers may desire information specifying how a limited budget should be spent, the success of one or more advertisements in one or more campaigns and how profit may be maximized for a given budget. Additionally, before an advertiser modifies the money spent on one or more campaigns, an advertiser may desire information specifying how such a modification will affect profit, the number of users who view one or more advertisements, etc.

In order to overcome shortcomings associated with existing advertisement management and optimization techniques, embodiments of the present invention provide systems and methods for allowing an advertiser to manage one or more advertisement campaigns within a budget and further view and implement one or more advertising media plans providing a prediction of the performance of one or more advertisements in a given advertiser's budget.

SUMMARY OF THE INVENTION

The present invention is directed towards methods and systems for optimizing the selection and delivery of advertisements from among one or more advertising campaigns. According to one embodiment of the invention, the method comprises retrieving one or more advertisements organized according to one or more advertisement campaigns. Advertiser specified constraints and target values associated with the one or more advertisements are retrieved. Additionally, a forecast for the performance for the one or more advertisements is generated. The constraint and target values associated with the one or more advertisements, as well as the forecast information, are used to generate a media plan for the one or more advertisements. The one or more advertisements are distributed according to the media plan generated.

The one or more advertisements retrieved are retrieved for a given advertiser. According to one embodiment of the invention, an advertiser may specify a budget constraint wherein a budget constraint comprises an advertiser specified indication of the maximum dollar amount to be spent on distributing the one or more advertisements in the one or more advertising campaigns. An advertiser may also specify a maximum bid constraint for the one or more advertisements in the one or more advertising campaigns. Additionally, an advertiser may provide an indication of a lowest position in a ranked list of advertisements at which one or more advertisements in the one or more campaigns may appear.

An advertiser may further specify one or more funnel values. According to one embodiment of the invention, a funnel value comprises an indication of a value of a given advertisement being displayed. According to another embodiment of the invention, a funnel value comprises an indication of a value of a given advertisement being selected by a user. According to yet another embodiment of the invention, a funnel value comprises an indication of a value of a given user selecting an advertisement and browsing an advertiser web site. According to a further embodiment of the invention, a funnel value comprises an indication of a value of a given user selecting an advertisement and adding one or more items to a shopping cart on an advertiser web site. According to another embodiment of the invention, a funnel value comprises an indication of a value of a given user purchasing one or more products in response to a given advertisement. According to yet another embodiment of the invention, a funnel value comprises an indication of a target revenue earned on or more advertisements.

A forecast for the performance of the one or more advertisements retrieved may be generated. According to one embodiment of the invention, a forecast is generated using historical data for one or more advertisements displayed in response to one or more search terms. The historical data is used to calculate an average number of funnel values obtained at one or more bid amounts for the one or more advertisements displayed in response to the one or more search terms. The historical data retrieved may comprise one or more advertising events in a value funnel, as well as a bid associated with a given advertisement displayed in response to one or more search terms.

A media plan is generated identifying one or more execution parameters for the one or more advertisements in a given advertiser's budget. According to one embodiment of the invention, the execution parameters of a media plan comprise an indication of a bid amount for the one or more advertisements. The media plan may be generated according to the forecast data and the advertiser specified constraint and target values.

According to one embodiment of the invention, the one or more advertisements are distributed with associated bids to one or more channels, wherein a channel may comprise an entity through which advertising may be conducted, such as a search engine or a web site.

The present invention is further directed towards a system for optimizing the selection and delivery of advertisements from among one or more advertising campaigns. According to one embodiment, the system of the present invention comprises an advertisement data store operative to store one or more advertisements organized according to one or more advertising campaigns as well as associated constraint and target values. The advertisement data store may also store a budget associated with the one or more advertising campaigns wherein a budget may comprise an indication of a maximum dollar amount to be spent on the distribution of one or more advertisements in one or more advertising campaigns. The advertisement data store may further store an indication of a maximum bid amount to be bid for the distribution of one or more advertisements as well as an indication of a lowest position in a ranked list of advertisements at which the one or more advertisements may appear. Additionally, the advertisement data store may store one or more values for the one or more advertising events in a value funnel. According to one embodiment of the invention, a funnel value comprises an indication of a value for a given advertisement being displayed. According to another embodiment of the invention, a funnel value comprises an indication of a value for a given advertisement being selected by a user. According to yet another embodiment of the invention, a funnel value comprises an indication of a value for a given user selecting an advertisement and browsing an advertiser web site. According to a further embodiment of the invention, a funnel value comprises an indication of a value for a given user selecting an advertisement and adding one or more items to a shopping cart on an advertiser web site. According to another embodiment of the invention, a funnel value comprises an indication of a value for a given user purchasing one or more products from an advertiser website in response to a given advertisement. According to yet another embodiment of the invention, a funnel value comprises an indication of a target revenue earned on one or more advertisements.

The system further comprises an analytics data store operative to store historical data for the one or more advertisements. The analytics data store may store click through data for one or more advertisements as well as a bid amount for the display of one or more advertisements. Additionally, the analytics data store may store one or more advertising events obtained at one or more bid amounts.

A forecast component is operative to generate forecast data for the one or more advertisements using the historical data retrieved from the analytics data store. According to one embodiment of the invention, the forecast component is operative to retrieve historical data from the analytics data store for the one or more advertisements and generate a forecast for the one or more advertising events in a value funnel obtained at one or more bid levels.

A spend planner component is operative to generate one or more media plans identifying execution parameters for the one or more advertisements using the forecast data and constraint and target values. According to one embodiment of the invention, the execution parameters identify bid amounts for the one or more advertisements. The one or more media plans generated may be stored in a media plan data store, operative to store one or more media plans.

A distribution component is operative to distribute the one or more advertisements according to the execution parameters for a given media plan. The distribution component may distribute the one or more advertisements and associated bids to one or more channels, wherein a channel may comprise a search engine or a web site.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

In the following description of the preferred embodiment, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
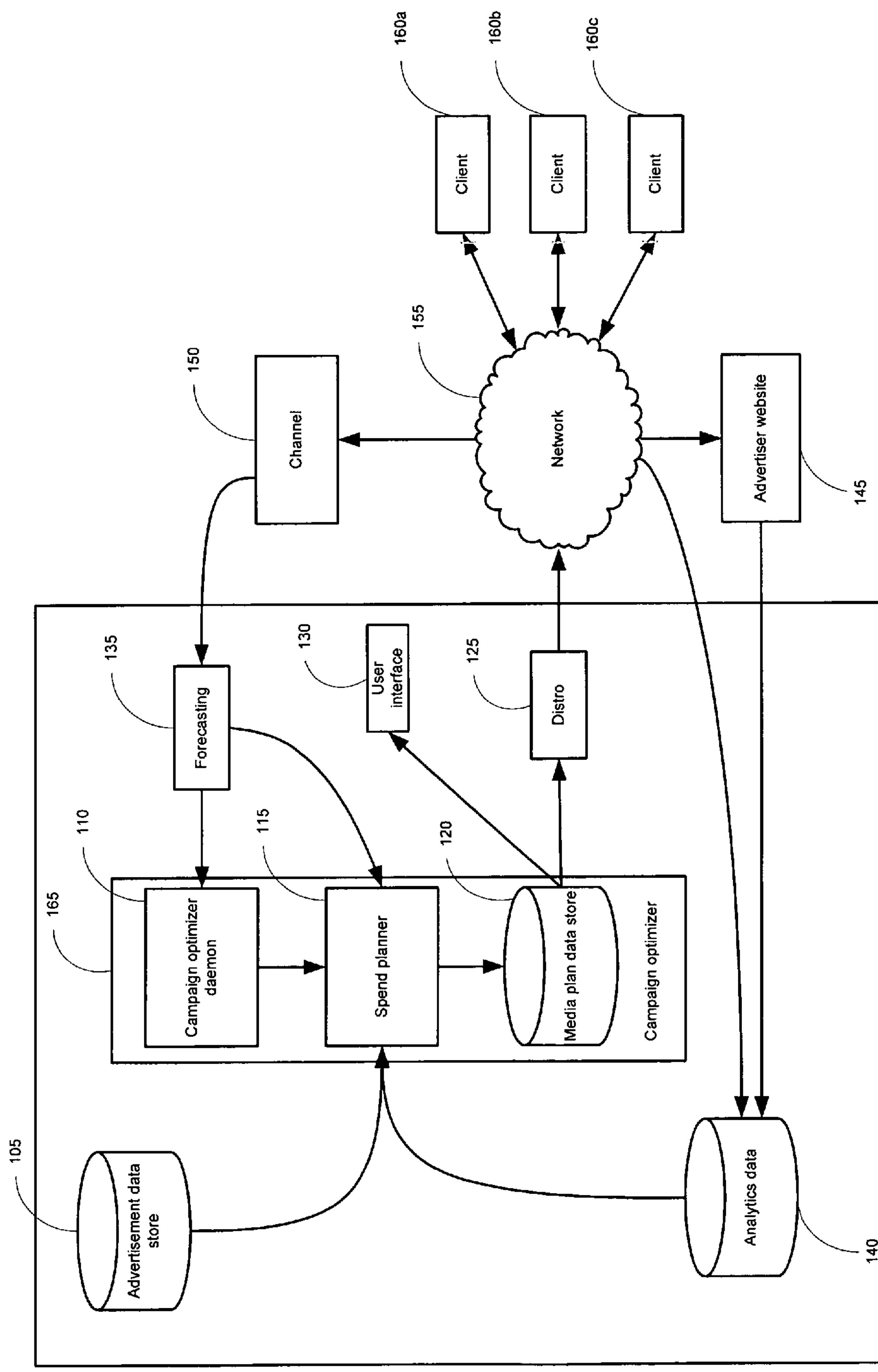
FIG. 1 is a block diagram presenting a system for generating media plans for one or more advertisements within advertiser specified constraints, according to one embodiment of the present invention.

FIG. 1 is a block diagram illustrating a system for generating one or more media plans for the delivery of one or more advertisements. According to the embodiment of FIG. 1, one or more advertisement campaigns comprising one or more advertisements are stored in an advertisement data store 105. Advertising campaigns may include sponsored search listings or links to an advertiser's webpage.

A budget associated with the one or more campaigns may be stored in the advertisement data store 105. A budget comprises an indication of the maximum dollar value a given advertiser has available to spend on the one or more advertisements in an advertiser's one or more campaigns.

In addition to budget information, the advertisement data store 105 may also contain targets and constraints, which may be generally described as performance goals and restrictions upon advertising, respectively. For example, a constraint may comprise a limit upon a bid amount in an auction-based system or marketplace for advertising. A marketplace may be used to place bids on search terms or groups of terms that when used in a search query cause the display of an advertiser's advertisements or links to advertisements among the displayed results. Bids may also be made to secure prominence and positions for an advertiser's one or more advertisements in response to a given search query. For example, an advertiser may desire to display a given advertisement or group of advertisements in response to one or more terms and may further desire to display the advertisement in a particular position of a result set that a search engine returns. Through the use of a marketplace or auction-based system, bids may be placed on the one or more terms corresponding to the advertisements the advertiser wishes to display. The advertisers with the greatest bids for one or more keywords may have their advertisements displayed in the most prominent positions of a given result set of advertisements.

Figure 2:
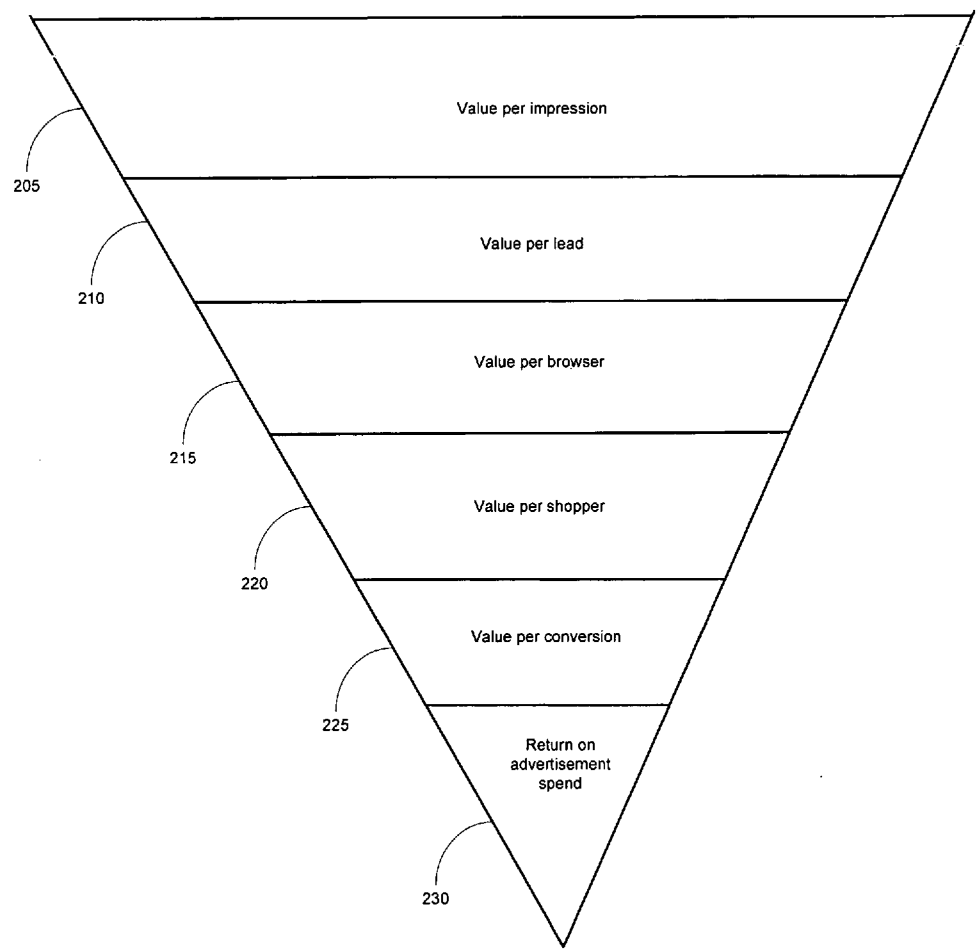
FIG. 2 is a screen diagram presenting a value funnel for collecting one or more advertising events associated with an advertisement, according to one embodiment of the present invention.

A target may comprise an indication of the cost per acquisition ("CPA") or return on advertisement spend ("ROAS") for a given advertisement. Cost per acquisition generally relates to an advertiser's cost for a given advertising event or metric. Advertising events or metrics include, but are not limited to, impressions, leads, browsers, shoppers and conversions, where impressions comprise the display of one or more advertisements, leads comprise selection of one or more advertisements by a user, browsers comprise users accessing one or more pages of an advertiser's website associated with a given advertiser's products or services, shoppers comprise users who add products to a shopping cart displayed by a given advertisement, and conversions comprise purchases of products advertised by an advertisement selected by a user. For example, if a given advertisement resulted in two hundred purchases, and the advertisement cost an advertiser one thousand dollars to display, the advertiser's cost per acquisition for conversions would equal five dollars. Similarly, if a given advertisement cost an advertiser one hundred dollars to display and the advertisement was selected five thousand times, the advertiser's cost per acquisition for leads would equal two cents. According to methods described herein, an advertiser may specify the cost per acquisition for one or more advertising events or metrics according to a value funnel, as illustrated in FIG. 2.

Return on advertisement spend (ROAS) generally comprises the revenue earned on one or more advertisements displayed to users. Advertisers may have a plurality of advertisements to display to users of client devices in response to various search requests. Furthermore, advertisers may pay a fee for displaying advertisements in response to various search requests. While an advertiser may display a plurality of advertisements directed at various products offered by the advertiser, only a few of the advertisements displayed result in actual purchases. An advertiser may want to ensure that the amount of money earned on purchases exceeds the amount of money spent on advertising. According to methods described herein, an advertiser may specify the return on advertisement spend for one or more advertisements.

According to one embodiment of the invention, an advertiser may specify a maximum bid constraint for storage in the advertisement data store 105. A maximum bid constraint may comprise an indication of the greatest dollar value an advertiser is willing to spend on any one or more advertisements in one or more campaigns. According to one embodiment of the invention, an advertiser may specify a maximum bid constraint for one or more individual advertisements. According to another embodiment of the invention, an advertiser may specify a maximum bid constraint for all advertisements in a given campaign. According to yet another embodiment of the invention, an advertiser may specify a maximum bid constraint for all advertisements in a given budget.

An advertiser may also specify a target minimum position. A target minimum position may comprise an indication of the lowest allowable ranking at which one or more advertisements may be displayed in a ranked list of advertisements. For example, an advertiser may indicate a desire to have one or more advertisements ranked either first, second or third in a ranked list of advertisements. Therefore, the advertiser may define a target minimum position of three (3). According to one embodiment of the invention, an advertiser may specify a target minimum position for one or more individual advertisements. According to another embodiment of the invention, an advertiser may specify a target minimum position for all advertisements in a given campaign. According to yet another embodiment of the invention, an advertiser may specify a target minimum position for all advertisements in a given budget.

An advertiser may also specify the values for one or more advertising events or metrics in a value funnel (illustrated in FIG. 2). According to one embodiment of the invention an advertiser may specify values associated with impressions, leads, browsers, shoppers, conversions and return on advertisement spend. The one or more values specified by an advertiser are stored in the advertisement data store 105 with associated advertisements or campaigns. The values allow an advertiser to indicate the value of one or more advertising events or metrics for the one or more advertisements in a given budget.

The analytics data store 140 is operative to store click through data for the one or more advertisements stored in the advertisement data store 105. According to one embodiment of the invention, the analytics data store 140 maintains data on the number of times a given advertisement was selected, the time a given advertisement was displayed and user characteristics of a given user that selected a given advertisement, e.g., by reference to a profile for the given user. According to another embodiment of the invention, the analytics data store 140 maintains data pertaining to one or more keywords submitted by users of client devices **160*a*, 160*b* and 160*c*. For example, the analytics data store 140 may maintain information indicating the cost for displaying an advertisement in response to a given user search query. According to yet another embodiment of the invention, the analytics data store 140** maintains data on the one or more values in a value funnel for one or more advertisements.

The analytics data store 140 is an accessible memory structure such as a database, CD-ROM, tape, digital storage library, etc., and may be implemented as a database or any other type of data storage structure capable of providing for the retrieval and storage of a variety of data types. The analytics data store 140 may also store a variety of data related to advertisements. Information in the analytics data store 140 may be maintained in advertisement groups according to advertiser, product, category, keywords, funnel values or a combination thereof.

One or more advertisements, constraints, targets, funnel values and budget information for an advertiser are delivered to the spend planner component 115. The spend planner component 115 is operative to generate one or more execution plans identifying the one or more execution parameters for one or more advertisements in a given advertiser's budget. According to one embodiment of the invention, the execution parameters of an execution plan identified by the spend planner component 115 are based upon the one or more aspects of an advertisement that a channel 150 allows to be varied. For example, Yahoo! may allow an advertiser to vary the bid associated with the keywords for displaying a given advertisement or whether a given advertisement is online or offline. The execution parameters of the one or more execution plans identified by the spend planner component 115 may alter whether the one or more advertisements in a given advertiser's budget are online or offline while also altering the bid amount associated with the one or more advertisements in a given advertiser's budget.

The one or more execution parameters of a given execution plan that the spend planner component 115 generates may also be based upon the one or more advertiser specified advertisement constraints. For example, as previously described an advertiser may set a maximum bid constraint on one or more advertisements in a given advertiser's budget. The execution parameters that the spend planner component 115 generates for a given execution plan respect the advertiser's constraints and not identify bid execution parameters that violate a given advertiser's one or more bid constraints.

The one or more execution parameters for a given execution plan generated by the spend planner component 115 are annotated with forecast data from the forecasting component 135. According to one embodiment of the invention, the spend planner component 115 delivers one or more keywords associated with displaying one or more advertisements in a given advertiser's budget to the forecasting component 135. The forecasting component 135 is operative to retrieve information regarding the one or more advertisements displayed in response to the one or more keywords delivered to the forecasting component 135.

The forecasting component 135 retrieves information for the one or more advertisements based upon one or more steps in a value funnel, as well as the bid associated with a given advertisement and its position in a ranked list of advertisements. For example, the spend planner component 115 may deliver the key words "notebook computer" to the forecasting component 130. The forecasting component 130 may retrieve historical information regarding the one or more advertisements displayed in response to the key words "notebook computer", the bids associated with the one or more advertisements, as well as the position of the one or more advertisements in a ranked list of advertisements.

The forecasting component 135 may further be operative to retrieve historical data regarding the one or more advertisements displayed in response to the key words "notebook computer" based upon the one or more steps in the value funnel. For example, the forecasting component 135 may retrieve historical data indicating that a given advertisement received two hundred impressions, eighty leads, forty browsers, eight shoppers and four conversions. The forecast component 135 may retrieve historical data from the analytics data store 140 indicating the number and type of advertising events obtained at various bid amounts for one or more key words, as well as the position of one or more advertisements in a ranked list of advertisements displayed in response to the given key words. According to one embodiment of the invention, the forecast component 135 calculates the average number of advertising events obtained at various bid amounts for the one or more advertisements displayed in response to one or more key words to provide a forecast of the expected number of advertising events that may be obtained at various bid amounts.

The various execution parameters generated by the spend planner component 115 for a given execution plan are annotated by the spend planner component 115 with the forecast data from the forecasting component 135. For example, the execution parameters for a given execution plan may identify various bid amounts associated with the one or more advertisements in the execution plan. The forecast data as obtained from the forecasting component 135 may be used to annotate the execution parameters at each respective bid amount and may indicate the varying levels of funnel values (as illustrated in FIG. 2) that are obtained at varying bid amounts. According to one embodiment of the invention, the forecast data may indicate the number of impressions, leads, browsers, shoppers and conversions obtained at one or more bid amounts. Table A illustrates an exemplary execution plan wherein advertisements are annotated with forecasting information from the forecasting component 135.

TABLE A

| Advertisement | Bid associated with the one or more key words for displaying the advertisement | Average position in ranked list of advertisements | Average forecast values for advertisement at bid amount and position |
|---|---|---|---|
| A1 | $2.50 | 7 | Impressions: 200<br>Leads: 120<br>Browsers: 40<br>Shoppers: 18<br>Conversions: 2 |
| A2 | $1.50 | 5 | Impressions: 300<br>Leads: 320<br>Browsers: 60<br>Shoppers: 28<br>Conversions: 4 |
| A3 | $2.00 | 3 | Impressions: 500<br>Leads: 420<br>Browsers: 92<br>Shoppers: 42<br>Conversions: 12 |

The one or more execution parameters annotated with forecast data may be further annotated with advertisement specific analytics data stored in the analytics data store 140. According to one embodiment of the invention, the analytics data store 140 maintains information identifying the various advertising events associated with a given advertisement. For example, the analytics data store 140 may indicate that a given advertisement displayed in response to the key words "notebook computer" resulted in forty user selections and twelve purchases with an associated bid of $4. The forecast data obtained from the forecasting component 135, however, may indicate that the average advertisement displayed in response to the term "notebook computer" at a bid of $4 resulted in three hundred user selections and four purchases. Therefore, the execution parameters for the one or more advertisements in a given advertiser's budget are annotated with advertisement specific analytics data to provide a more accurate prediction of the number of advertising events a given advertisement obtains when displayed in response to a given one or more key words at a given bid amount.

The spend planner component 115 uses the annotated execution parameters of the one or more execution plans, as well as a given advertiser's budget, constraints and funnel values to generate one or more media plans. A media plan generated by the spend planner component 115 identifies the optimal execution parameters used in conjunction with a given set of advertisements in an advertiser's budget. According to one embodiment of the invention, a media plan identifies the optimal bid amounts for the advertisements in a given advertiser's budget.

The spend planner component 115 generates one or more media plans with execution parameters that do not exceed the one or more constraints associated with a given budget. As previously described, a budget specifies the maximum dollar value an advertiser is willing to spend on one or more advertisements in one or more campaigns. The spend planner component 115 is operative to formulate one or more media plans that apportion a given advertiser's budget, ensuring that a given budget is not exceeded. According to one embodiment of the invention, the spend planner component 115 attempts to utilize all available funds in a given advertiser's budget.

The spend planner component 115 uses a scoring function to calculate an efficiency value for the one or more advertisements in a given advertiser's budget. The efficiency values associated with the one or more advertisements in a given budget are used to select advertisements to be included in a given media plan. According to one embodiment of the invention, the scoring function utilizes the forecasted funnel values, the advertisement specific analytics data, and the advertiser specified funnel values to calculate the efficiency of a given advertisement. According to one embodiment, the one or more advertisements in a given advertiser's budget are sorted in descending order by efficiency value. Advertisements with the greatest efficiency values are selected for inclusion in a given media plan until exhaustion of an advertiser's budget. The cost associated with a given advertisement is an emergent property based upon the efficiency value as calculated by the scoring function. The scoring function determines the bid value associated with a given advertisement based upon the calculated efficiency of the advertisement without exceeding a given advertiser's constraints. Various bid amounts are analyzed to determine the bid amount that produces the greatest efficiency for a given advertisement.

The one or more media plans generated by the spend planner component may be stored in the media plan data store 120. According to one embodiment of the invention, each media plan has a set of associated attributes. The attributes associated with a media plan may include, but are not limited to, a name, the budget of the campaign or campaigns for which the media plan was generated and a date, which may indicate the period of time a media plan is to be executed.

Media plans generated by the spend planner component 115 and stored in the media plan data store 120 may be viewed by advertisers through the user interface 130. According to one embodiment of the invention, an advertiser may select a media plan from the media plan data store 120 for execution. According to another embodiment of the invention, the spend planner component 115 selects a media plan from the media plan data store 120 for execution. According to yet another embodiment, the user interface 130 provides an advertiser with the ability to examine the projected outcome of a given media plan without actually executing the media plan. The execution parameters for a given media plan, with annotated forecast values, allow an advertiser to view the projected outcome of the media plan with respect to the one or steps of the value funnel. According to a further embodiment of the invention, an advertiser may utilize the user interface 130 to increase or decrease the budget associated with one or more advertisements stored in the advertisement data store 105 to determine how the increase or decrease in budget will affect the performance and outcome of one or more advertisements.

A media plan selected for execution either by an advertiser using the user interface 130 or by the spend planner component 115, is delivered to the distribution component 125. The distribution component 125 is operative to deliver the one or more advertisements and bid execution parameters of a media plan to one or more channels 150. A channel 150, such as Yahoo.com, may be operative to receive one or advertisements and associated bids and distribute one or more advertisements according to the bids associated with the one or more advertisements. Users of client devices **160*a*, 160*b* and 160*c* communicatively coupled to the network 155 may select one or more of the advertisements displayed by a given channel 150 as part of a web page. If a user of a client device 160*a*, 160*b* and 160*c* selects an advertisement displayed on a given web page, the user may be redirected to an advertiser's web site 145. Users interactions with an advertisement and web page are tracked and may be delivered to the analytics data store 140**.

The campaign optimizer daemon 110 is operative to invoke the spend planner component 115 to generate one or more media plans. According to one embodiment of the invention, the campaign optimizer daemon 110 invokes the spend planner component 115 when a given advertiser adds or deletes one or more advertisements from the advertisement data store 105. According to another embodiment of the invention, the campaign optimizer daemon 110 invokes the spend planner component 115 when an advertiser modifies one or more constraints or targets, or updates an existing budget.

According to yet another embodiment of the invention, the campaign optimizer daemon 110 invokes the spend planner component 115 upon receipt of an alert from the forecasting component 135 indicating a recent deviation in the frequency of search requests for one or more keywords submitted by users of client devices **160*a*, 160*b* and 160*c* to one or more channels 150. The forecast component may be operative to monitor one or more channels 150, such as the Yahoo! search engine. The forecasting component 135 may identify significant deviations in search requests for one or more keywords made by users of client devices 160*a*, 160*b* and 160*c* and alert the campaign optimizer daemon 110** of such deviations.

According to a further embodiment of the invention, the campaign optimizer daemon 110 invokes the spend planner component 115 at regular intervals, which may be predetermined. Alternatively, or in conjunction with the foregoing, the campaign optimizer daemon 110 invokes the spend planner component 115 when a given media plan is nearing expiration or has expired. For example, a given media plan may execute for a period of twenty-four hours. The campaign optimizer daemon 110 may notify the spend planner component 115 at a given time interval before a given media plan is expiring that a new media plan must be generated.

FIG. 2 presents an illustration of a value funnel data structure, wherein a value funnel comprises the one or more advertising events or metrics that may be associated with one or more advertisements. According to the value funnel illustrated in FIG. 2, an advertiser may specify the value per impression 205 for one or more advertisements, wherein an impression 205 comprises displaying an advertisement in response to a given request. For example, a given campaign $C_1$ for advertising a given advertiser's computer products may be comprised of advertisements $A_1$, $A_2$, $A_3$ . . . $A_n$. Advertisement $A_1$ may be an advertisement for notebook computers whereas advertisements $A_2$ may be an advertisement for mouse pads. An advertiser may specify that the value per impression for displaying advertisement $A_1$ in response to the key words "notebook computer" is fifty cents, whereas the value per impression for displaying advertisement $A_2$ in response to the key words "mouse pads" is ten cents. An advertiser may specify the value per impression for one or more advertisements. Alternatively, an advertiser may specify the value per impression for all advertisements in a given campaign, group of advertisements, or advertisements in an advertiser's budget.

According to the value funnel illustrated in FIG. 2, an advertiser may also specify the value per lead 210 for one or more advertisements, which may comprise the value of a user selecting a given advertisement displayed in response to a given request. For example, an advertiser may have various advertisements directed at selling computer products, including mouse pads, Ethernet cords, wireless routers, hard drives, etc. With reference to the abovementioned campaign $C_1$, an advertiser may specify that the value per lead for a user selecting advertisement A1 directed at selling Ethernet cords is fifty cents, whereas the value per lead for a user selecting advertisement A2 directed at selling hard drives is four dollars. The advertiser may specify that the value per lead associated with a user selecting advertisement A2 for hard drives is greater than the value per lead associated with a user selecting advertisement A1 for an Ethernet cord since the purchase of a hard drive may result in greater profit for the advertiser. Those of skill in the art recognize other permutations are possible.

An advertiser may also specify a value per browser 215 for one or more advertisements, which according to one embodiment of the invention comprises the value associated with a user selecting a given advertisement and accessing one or more pages of a given advertiser's website associated with a given advertiser's products or services. With reference to the abovementioned campaign $C_1$, an advertiser may specify that the value of a user selecting advertisement $A_1$ and browsing the products associated with advertisement $A_1$ is four dollars, whereas the value of a user selecting advertisement $A_2$ and browsing the products associated with advertisement $A_2$ is two dollars. An advertiser may specify the value per browser for one or more advertisements. Alternatively, an advertiser may specify the value per browser for all advertisements in a given campaign or all advertisements in an advertiser's budget.

An advertiser may also specify a value per shopper 220 for one or more advertisements, which may comprise the value associated with a user selecting a given advertisement, accessing a given advertiser's webpage, and adding one or more of an advertiser's products to a shopping cart on the advertiser's webpage. With reference to the abovementioned campaign $C_1$, an advertiser may specify that the value of a user selecting advertisement $A_1$ and adding one or more items associated with advertisement $A_1$ to a shopping cart on the advertiser's web site is six dollars, whereas the value of a user selecting advertisement $A_2$ and adding one or more items associated with advertisement $A_2$ is three dollars. An advertiser may specify the value per shopper for one or more advertisements. Alternatively, an advertiser may specify the value per shopper for all advertisements in a given campaign or all advertisements in an advertiser's budget.

Similarly, an advertiser may specify a value per conversion 225 for one or more advertisements, which according to one embodiment of the invention comprises the value associated with a user purchasing a product or service displayed by a given advertisement. An advertiser's one or more advertisements may be directed at products that result in varying levels of revenue for the advertiser. For example, the revenue earned by a car dealer on the sale of a new car may be significantly greater than the revenue earned on the sale of a used car. An advertiser with one or more advertisements for new cars and one or more advertisements for used cars may specify that the value per conversion associated with a user purchasing a new car is greater than the value per conversion associated with a user purchasing a used car.

According to the embodiment illustrated at FIG. 2, an advertiser may also specify the return on advertisement spend (ROAS) 230, wherein return on advertisement spend 230 comprises an indication of the revenue earned on a given advertisement. For example, an advertiser may spend one dollar each time a given advertisement for a notebook computer is selected by a user. If the advertisement is selected four hundred times, the advertiser will spend a total of four hundred dollars on the advertisement. If every four hundred user selections results in a purchase of $1200, the advertiser's return on advertisement spend is the amount the advertiser earns on a given purchase ($1200), minus the amount the advertiser spent on the advertisement ($400), resulting in a return on advertisement spend of $800. Tracking codes inserted in a given advertisement and HTML tags inserted in a given advertiser's web page may be used to facilitate the identification of the return on advertisement spend. Those of skill in the art recognize that a value funnel may comprise one or more other advertising events or metrics and associated values that may be used to monitor the performance of a given advertisement.

Figure 3:
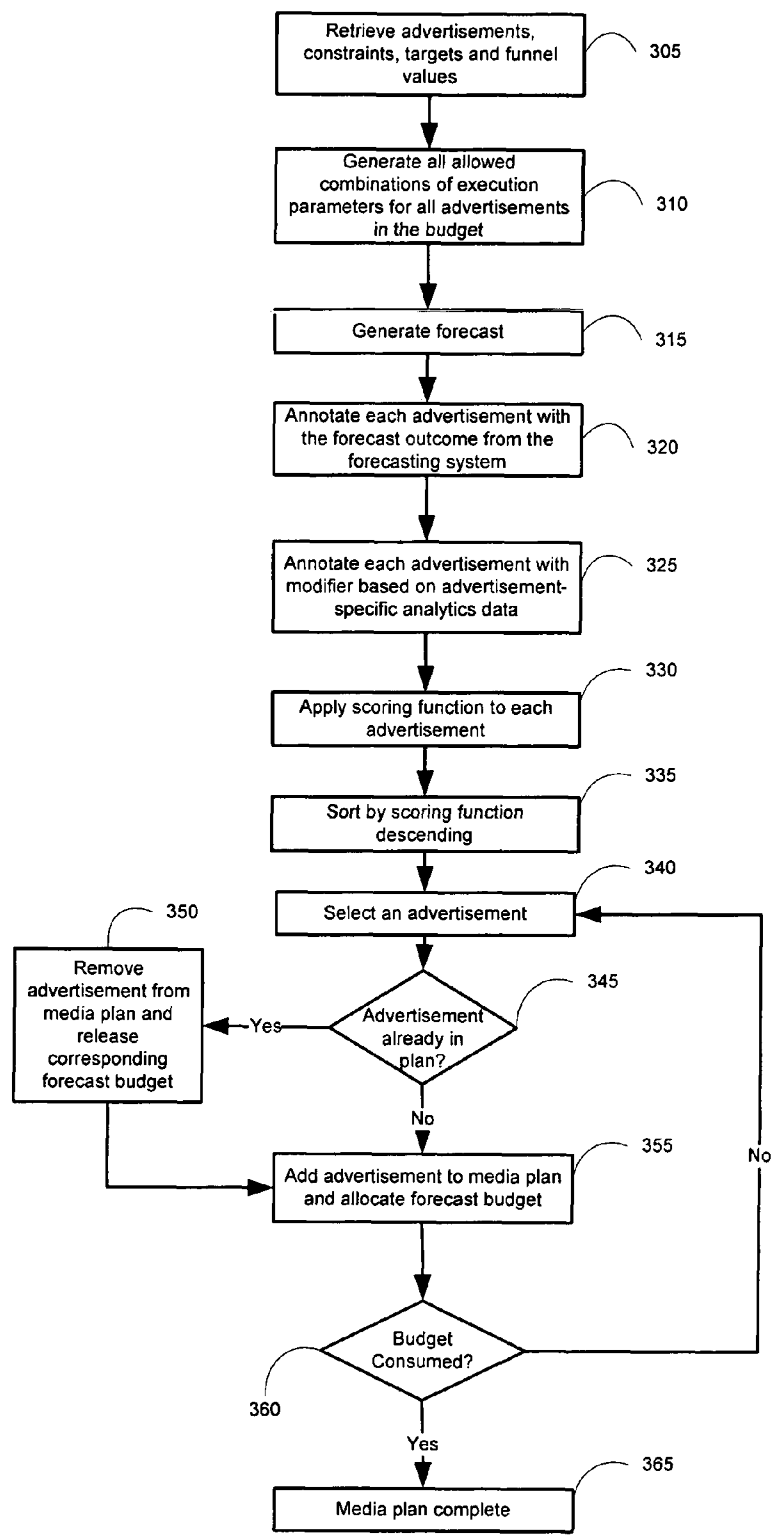
FIG. 3 is a flow diagram presenting a method for generating media plans according to one embodiment of the present invention.

FIG. 3 presents a flow diagram illustrating one embodiment of a method for selecting advertisements from a budget for inclusion in a media plan. One or more advertisements in a given advertiser's budget, as well associated constraint and target information are retrieved, step 305. One or more execution plans are generated, a given execution plan identifying allowed combinations of execution parameters for the retrieved advertisements based upon the advertiser specified target and constraint information, step 310. For example, an advertiser may specify that an advertisement displayed in response to the term "notebook computer" is to be displayed in position one or two of a ranked list of advertisements. An advertiser may further specify that the maximum bid for the term "notebook computer" is three dollars. The one or more execution plans may identify various execution parameters with varying bid amounts for the term "notebook computer." The one or more advertisements and associated target and constraint information are used to generate permutations of the allowed execution parameters for a given advertiser's budget.

The one or more key words associated with displaying the one or more advertisements in a given advertiser's budget may be used by a forecasting component to generate a forecast of the performance of a given advertisement, step 315. A forecasting component may receive one or more keywords and provide information, using historical data, on the one or more advertisements displayed in response to the one or more keywords. With reference to the value funnel illustrated in FIG. 2, the forecasting component may determine the expected number of impressions, leads, browsers, shoppers and conversions, the return on advertisement spend as well as other events, for one or more advertisements displayed in response to one or more keywords at a particular bid amount based upon historical data.

The execution parameters for the one or more execution plans for a given advertiser's budget are annotated with the forecast data, step 320. For example, a given advertisement for the key words "notebook computer" may have a maximum bid constraint of $1 and a minimum rank position of four. The forecast data may indicate that a bid of eighty-nine cents for displaying an advertisement in response to the query "notebook computer" results in an advertisement being displayed in position four of a ranked list of advertisements. The forecast data may further indicate that a bid of eighty-nine cents results in an average of one hundred impressions, fifty leads, thirty browsers, twenty shoppers, and two conversions. The execution plan identifying a bid of eighty-nine cents for the term "notebook computer" is annotated with the corresponding forecast data.

Similarly, the forecast data may indicate that a bid of ninety-three cents for displaying an advertisement in response to the query "notebook computer" results in an advertisement being displayed in position three of a ranked list of advertisements. The forecast data may further indicate that a bid of ninety-three cents for the term "notebook computer" results in an average of two hundred impressions, eighty leads, forty browsers, thirty shoppers, and eight conversions. The execution plan identifying a bid of ninety-three cents for the term "notebook computer" is annotated with the corresponding forecast data. The various bid execution parameters of the one or more execution plans for the advertisements in an advertiser's budget are annotated with the corresponding forecast data.

The execution parameters of the one or more execution plans for a given advertiser's budget may be further annotated with advertisement specific analytics data, step 325. For example, the forecast data may indicate that an advertisement displayed in response to the query terms "notebook computer" at a bid of ninety-five cents will receive an average of one hundred impressions, fifty leads, thirty browsers, twenty shoppers, and two conversions. However, analytics data may indicate that a given advertisement performed better or worse than indicated by the forecast data. For example, a given advertisement displayed in response to the terms "notebook computer" may have actually received two hundred impressions, eighty leads, forty browsers, thirty shoppers and three conversions. The execution parameters for the one or more execution plans are thus annotated with advertisement specific analytics data indicating the actual performance of the one or more advertisements in a given execution plan, step 325.

A scoring function is applied to the execution parameters of a given execution plan using the forecast data, the advertisement specific analytics data and the advertiser specified values in the value funnel associated with the one or more advertising events, step 330. The scoring function is used to calculate an efficiency value for the one or more advertisements in a given advertiser's budget based upon the execution parameters associated with a given advertisement in a given execution plan. Table B illustrates one embodiment of a scoring function that may be used to calculate an efficiency value of a given advertisement based upon the execution parameters of a given execution plan.

TABLE B $$S(A) = \sum_{m=\{i,l,a,r\}} (F(A_S)_m \times \Delta(A, F(A_S))_m \times V(A)_m)$$

In the equation presented in Table B, S is the scoring function, A is a given advertisement, $A_S$ is the search term for advertisement A, F is the forecast, Δ is the advertisement specific modifier based upon a given advertisement's analytics data, V is the value function and m is a given step in the value funnel (impressions, leads, browsers, shoppers, conversions and return on ad spend). An efficiency value is calculated for each advertisement in the one or more execution plans for a given advertiser's budget, step 330. The one or more advertisements in the one or more execution plans for a given advertiser's budget are sorted in descending order according to efficiency value, step 335.

A first advertisement is selected from a given execution plan, step 340. A check is performed to determine whether the advertisement selected is already in the media plan being generated, step 345. If the advertisement selected is not in the media plan, the advertisement is added to the media plan, and the cost associated with the advertisement is removed from the budget, step 355. The cost associated with a given advertisement is calculated using the forecast data for a given bid amount for the one or more keywords associated with the given advertisement. For example, the forecast data may indicate that the term "notebook computer" costs ten cents per impression and receives an average of one hundred impressions in a given period of time. Based upon the forecast data, at a bid amount of ten cents, an advertiser will be charged $10.00 (e.g., ten cents per impression*100 impressions) for an advertisement displayed in response to the term "notebook computer."

If the advertisement selected is already in the media plan, step 345, the advertisement in the media plan is removed and the cost associated with the removed advertisement is released from the budget, step 350. The selected advertisement is added to the media plan and the cost associated with the selected advertisement is added to the budget, step 355. A check is performed to determine whether a given advertiser's budget has been exhausted, step 360. If a given advertiser's budget is exhausted, the media plan is complete and may be executed or stored in a data store for later execution or viewing by a given advertiser, step 365. If a given advertiser's budget is not exhausted, a next advertisement from the one or more execution plans is selected for analysis, step 340.

Figure 4:
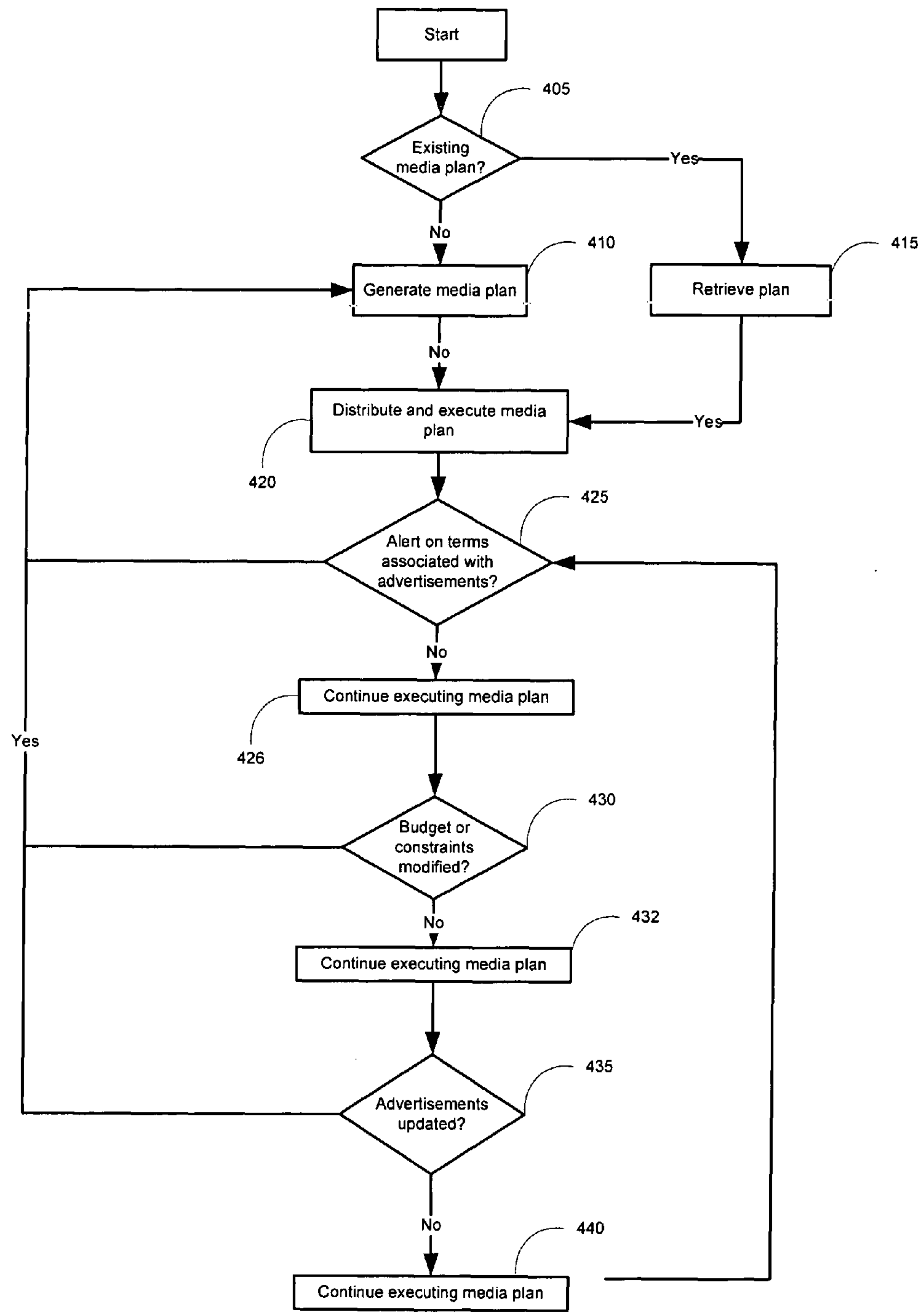
FIG. 4 is a flow diagram presenting a method for executing and monitoring a media plan, according to one embodiment of the present invention.

FIG. 4 presents a flow diagram illustrating one embodiment of a method for executing and monitoring a media plan for one or more advertisements in a given advertiser's budget. A check is performed to determine whether a media plan exists for the one or more advertisements in a given advertiser's budget, step 405. If an existing media plan is found, the media plan may be retrieved, e.g., from a media plan data store, step 415. According to one embodiment of the invention, an advertiser may select a media plan for execution from a plurality of media plans. Alternatively, or in conjunction, a media plan may be automatically selected. If an existing media plan is not found, a new media plan may be generated according to the methods described above, step 410. The one or more advertisements and associated bid execution parameters of a given media plan are delivered to one or more channels, step 420, which according to one embodiment of the invention may comprise a web site or a search engine. The one or more advertisements in a given media plan may be distributed by a given channel based upon bid amount and may be viewed and selected by users of client devices.

According to the embodiment illustrated in FIG. 4, the one or more channels that receive a media plan are monitored to identify trends in the search requests or key words entered by users of client devices associated with one or more advertisements in a media plan. Similarly, the one or more channels that receive a media plan may be monitored to identify trends in the web sites accessed by users of client devices. A check is periodically performed to determine any significant deviations in the quantity of users submitting search requests for terms associated with the one or more advertisements of a given advertiser's budget or users accessing one or more web sites or advertisements associated with one or more terms in order to generate an alert, step 425. If a significant deviation in the quantity of users submitting search requests or accessing advertisements or web sites associated with one or more terms is found, an alert may be generated to create new media plan, step 410. For example, if a significant increase is found for one or more terms, an alert may be generated which results in the construction of a new media plan identifying execution parameters with greater bids for the one or more terms that received increased user requests. If an alert on one or more terms associated with one or more advertisements in a given media plan is not generated, the channel continues to execute the existing media plan, step 426.

A check is performed to determine whether a given advertiser has modified the budget associated with one or more advertisements or whether an advertiser has modified one or more constraints associated with one or more advertisements in a given budget, step 430. If an advertiser has modified a budget or constraint, a new media plan is generated to optimally apportion the modified budget, step 410. Similarly, if an advertiser has modified a constraint, a new media plan is generated taking into account the modified constraints, step 410. If an advertiser has not modified an existing budget or any constraints associated with one or more advertisements in a given budget, the channel continues to execute the existing media plan, step 432.

An additional check is performed to determine whether an advertiser has modified any of the one or more advertisements in a given advertiser's budget, step 435. If an advertisement has been removed from or added to an existing budget, a new media plan is generated for the modified budget over a set of advertisements, step 410. If no modifications have been made to the advertisements in an existing budget, the channel continues executing the media plan, step 440.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

I claim:

1. A computerized method for optimizing the selection and delivery of one or more advertisements, the method comprising:

electronically retrieving, from an advertisement data store, one or more advertisements organized according to one or more advertisement campaigns;

electronically retrieving, from an analytics data store, advertiser specified constraints and target values associated with the one or more advertisements retrieved, wherein the advertiser specified constraints and target values comprise one or more advertiser specified funnel values;

electronically generating by a processing device a forecast for the performance of the one or more advertisements retrieved;

electronically generating by the processing device an original media plan for the one or more retrieved advertisements according to the constraints, the targets and the forecast, the generating of the media plan including identification of optimal execution parameters based on the specified constraints and target values, the execution parameters define instructions for selection of scenarios for advertisement placement consistent with at least one financial constraint associated with a budget;

electronically selecting the original media plan;

electronically monitoring one or more channels to identify a trend in search requests for one or more keywords from users;

electronically determining by the processing device if a deviation from the trend in search requests for one or more keywords from users exists;

electronically selecting a new media plan when a deviation from the trend in search requests for one or more keywords exists; and electronically executing the new media plan, including distributing the one or more advertisements according to execution parameters of the new media plan, the execution parameters having been modified based on the trend in search requests for one or more keywords.

2. The method of claim 1 wherein electronically retrieving one or more advertising campaigns comprises retrieving one or more advertising campaigns associated with a given advertiser.

3. The method of claim 1 wherein electronically retrieving advertiser specified constraints and target values comprises retrieving an advertiser specified indication of the budget associated with the one or more advertising campaigns retrieved.

4. The method of claim 3 wherein the budget comprises an indication of a maximum dollar amount to be spent on distribution of the one or more advertisements in the one or more advertising campaigns.

5. The method of claim 1 wherein electronically retrieving advertiser specified constraints and target values comprises receiving an indication of a maximum bid amount for the one or more advertisements.

6. The method of claim 1 wherein electronically retrieving advertiser specified constraints and target values comprises receiving an indication of a lowest position in a ranked list of advertisements at which the one or more advertisements appears.

7. The method of claim 1 wherein a funnel value comprises an indication of a value of a given advertisement being displayed.

8. The method of claim 1 wherein a funnel value comprises an indication of a value of a given advertisement being selected by a user.

9. The method of claim 1 wherein a funnel value comprises an indication of a value of a given user selecting an advertisement and browsing an advertiser web site.

10. The method of claim 1 wherein a funnel value comprises an indication of a value of a given user selecting an advertisement and adding one or more items to a shopping cart on an advertiser web site.

11. The method of claim 1 wherein a funnel value comprises an indication of a value of a given user purchasing one or more products in response to a given advertisement.

12. The method of claim 1 wherein a funnel value comprises an indication of a target revenue earned on one or more advertisements.

13. The method of claim 1 wherein electronically generating a forecast for the performance of the one or more retrieved advertisements comprises:

electronically retrieving historical data for one or more advertisements displayed in response to one or more search terms; and electronically calculating an average number of funnel values obtained at one or more bid amounts for the one or more advertisements displayed in response to the one or more search terms.

14. The method of claim 13 wherein the historical data comprises one or more advertising events in a value funnel.

15. The method of claim 13 wherein the historical data comprises a bid associated with a given advertisement displayed in response to one or more search terms.

16. The method of claim 1 wherein electronically generating a media plan comprises identifying one or more execution parameters for one or more advertisements in a given advertiser's budget according to one or more constraints, target values and forecast data.

17. The method of claim 16 wherein the execution parameters comprise an indication of a bid amount for one or more advertisements.

18. The method of claim 1 wherein electronically distributing the one or more advertisements comprises distributing the one or more advertisements and associated bids to one or more channels.

19. The method of claim 18 wherein a given channel comprises an entity through which advertising may be conducted.

20. The method of claim 19 wherein electronically distributing comprises distributing to a search engine.

21. The method of claim 19 wherein electronically distributing comprises distributing to a web site.

22. A system for optimizing the selection and delivery of one or more advertisements, the system comprising:

an advertisement data store operative to store one or more advertisements organized according to one or more advertising campaigns, an associated advertiser specified constraint and target values, wherein the advertiser specified constraint and target values comprise one or more advertiser specified funnel values;

an analytics data store operative to store historical data for one or more advertisements;

a forecast component operative to generate forecast data for the one or more advertisements using the historical data retrieved from the analytics data store;

a spend planner component operative to generate one or more media plans according to the constraints, the targets and the forecast data, the generating one or more media plans including the identification of-optimal execution parameters based on the advertiser specified constraints and target values, the execution parameters define instructions for selection of scenarios for advertisement placement consistent with at least one financial constraint associated with a budget for the one or more advertising campaigns;

a media plan data store operative to store the one or more media plans;

the spend planner component further operative to select an original media plan, monitor one or more channels to identify a trend in requests from users, determine if a deviation from the trend in search requests for one or more keywords from users exists and select a new media plan when a deviation from the trend in search requests for one or more keywords exists; and a distribution component operative to execute the new media plan, including distribute the one or more advertisements according to execution parameters of the new media plan, the execution parameters having been modified based on the trend in search requests for one or more keywords.

23. The system of claim 22 wherein an advertising campaign comprises one or more advertisements.

24. The system of claim 22 wherein the budget comprises an indication of a maximum dollar amount to be spent on the distribution of one or more advertising campaigns.

25. The system of claim 22 wherein the advertisement data store is operative to store an indication of a maximum bid amount to be bid for the distribution of one or more advertisements.

26. The system of claim 22 wherein the advertisement data store is operative to store an indication of a lowest position in a ranked list of advertisements at which the one or more advertisements appears.

27. The system of claim 22 wherein a funnel value comprises an indication of a value for a given advertisement being displayed.

28. The system of claim 22 wherein a funnel value comprises an indication of a value for a given advertisement being selected by a user.

29. The system of claim 22 wherein a funnel value comprises an indication of a value for a given user selecting an advertisement and browsing an advertiser web site.

30. The system of claim 22 wherein a funnel value comprises an indication of a value for a given user selecting an advertisement and adding one or more items to a shopping cart on an advertiser web site.

31. The system of claim 22 wherein a funnel value comprises an indication of a value for a given user purchasing one or more products from an advertiser website in response to a given advertisement.

32. The system of claim 22 wherein a funnel value comprises an indication of a target revenue earned on one or more advertisements.

33. The system of claim 22 wherein the analytics data store is operative to store click through data for one or more advertisements.

34. The system of claim 22 wherein the analytics data store is operative to store a bid amount for the display of one or more advertisements.

35. The system of claim 22 wherein the analytics data store is operative to store one or more advertising events obtained at one or more bid amounts.

36. The system of claim 22 wherein the forecast component is operative to:

retrieve historical data from the analytics data store for one or more advertisements; and generate a forecast for one or more advertising events in a value funnel obtained at one or more bid levels for the one or more advertisements.

37. The system of claim 22 wherein execution parameters identify bid amounts for the one or more advertisements.

38. The system of claim 22 wherein the distribution component is operative to distribute one or more advertisements and associated bids to one or more channels.

39. The system of claim 38 wherein a channel comprises a search engine.

40. The system of claim 38 wherein a channel comprises a web site.

* * * * *